United States Patent [19]

Edwards

[11] 4,343,245
[45] Aug. 10, 1982

[54] SUPPORT UNIT FOR SHELVING SYSTEM

[76] Inventor: Alwilda N. Edwards, 218 W. Thomas St., Rome, N.Y. 13440

[21] Appl. No.: 155,564

[22] Filed: Jun. 2, 1980

[51] Int. Cl.³ .............................................. A47B 47/00
[52] U.S. Cl. ...................................... 108/111; 108/59; 108/156; 211/134; 403/361
[58] Field of Search ....................... 108/59, 92, 97, 28, 108/156, 111, 157, 153, 91, 101; 211/134, 182, 189; 248/188.9, 188.1, 188.8, 188.91, 50, 146, 163; 52/299, 488; 182/220, 228; 403/361, 354, 289, 169, 167, 168; 297/440, 170, 171, 172

[56] References Cited

U.S. PATENT DOCUMENTS

| | | | |
|---|---|---|---|
| 1,773,586 | 8/1930 | Koering | 248/251 X |
| 2,145,168 | 1/1939 | Fletcher | 248/50 |
| 2,613,957 | 10/1952 | Ritter | 108/153 X |
| 2,681,782 | 6/1954 | Morishita | 248/106 |
| 2,944,780 | 7/1960 | Monk | 108/111 X |
| 3,180,288 | 4/1965 | McCowan | 108/156 X |
| 3,342,445 | 9/1967 | Boukamp | 248/188.9 |
| 3,625,163 | 12/1971 | Grossman | 108/156 |
| 4,077,728 | 3/1978 | Wigglesworth | 403/361 X |
| 4,108,316 | 8/1978 | Slater | 211/189 X |

FOREIGN PATENT DOCUMENTS

| | | | |
|---|---|---|---|
| 24879 | 1/1930 | Australia | 52/488 |
| 547421 | 10/1957 | Canada | 108/157 |
| 1295434 | 5/1962 | France | 108/111 |

Primary Examiner—James T. McCall
Attorney, Agent, or Firm—Bruns & Jenney

[57] ABSTRACT

A shelving system including support units that are easily secured to the shelves without the need of special tools or forming unsightly holes in the shelving. Each support unit contains a U-shaped bracket that is connected to the bottom surface of one shelf by a hidden wood screw. A pair of end caps which are similarly connected to the top surface of an opposed shelf slidably receive the legs of the bracket therein to form a high strength unit capable of supporting the shelves in a spaced-apart relationship.

10 Claims, 4 Drawing Figures

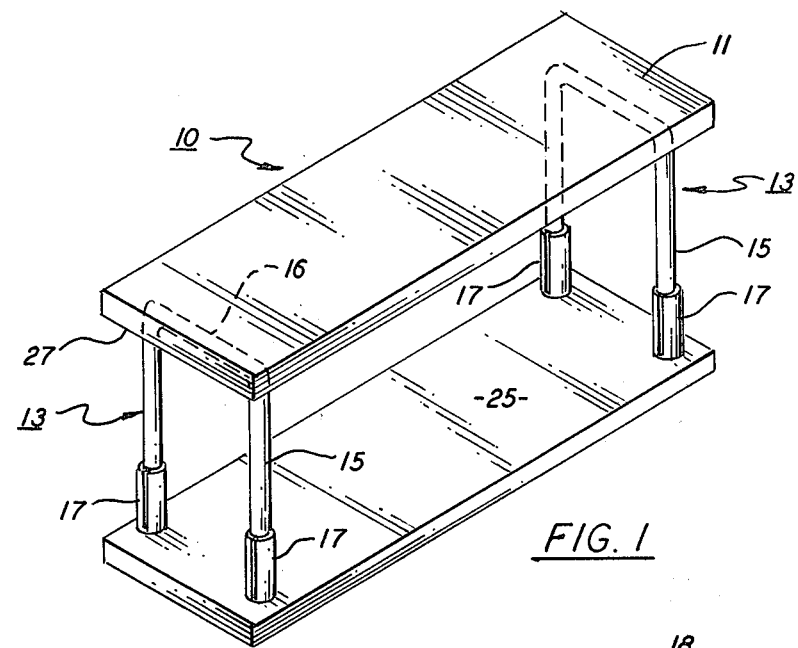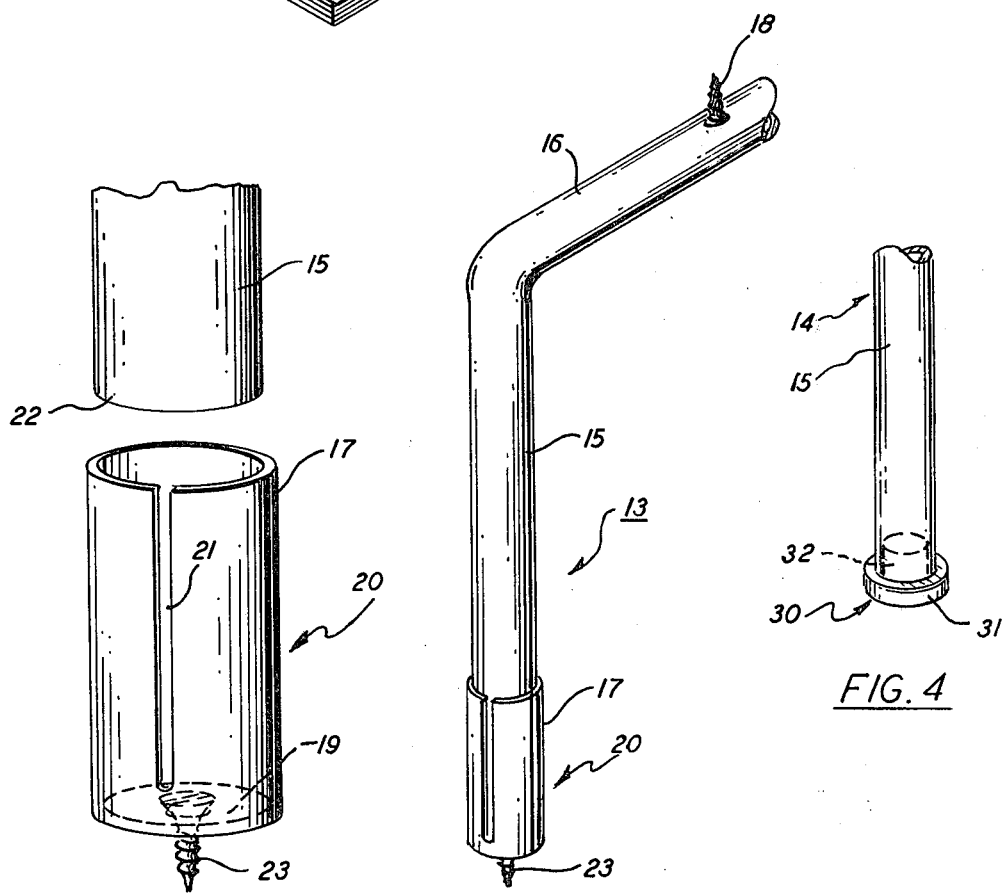

SUPPORT UNIT FOR SHELVING SYSTEM

BACKGROUND OF THE INVENTION

This invention relates to a shelving system and, in particular, to an improved support unit for use in a shelving system.

As exemplified in U.S. Pat. Nos. 3,180,288 and 2,944,780, different types of systems have been devised for supporting shelves in a superimposed or spaced apart configuration. For the most part these systems require that unsightly holes be machined within the shelves which greatly diminishes the aesthetic value of the finished product. Similarly, these prior art systems require that some type of hardware be secured to the shelf so that it is uniquely adapted to receive a leg or similar support member therein. This type of hardware generally adds considerably to the cost of the system and is typically difficult to position and install. Again the hardware usually interrupts the natural lines of the shelving and oftentimes distracts from the aesthetics of the finished structure.

It should be further noted that much of the shelving that is in use today is typically moved from time to time to different locations. Consequently, it is sometimes desirous to change the configuration of the shelves to suit the new location. Where the shelving has been extensively preworked or contains hardware at precise locations, adapting the shelving to fit into its new surroundings generally proves to be extremely difficult or in some cases, impossible, particularly when shelving is to be added or subtracted to the original unit.

In U.S. Pat. Nos. 4,108,316 and 3,625,163, support systems are described wherein at least one of the units supporting the shelves contains a flange having a number of screw holes formed therein. In order to assemble the component parts of the system, the flange must be prelocated in regard to the receiving member and holes drilled in the appropriate locations so that mounting screws can be positioned therein. This type of fabrication is not only time consuming but also subject to human error because of the number of separate operations that must be accomplished to complete the assembly. Here again, once assembled, the component parts are difficult to break down and reshape to formulate a new unit.

SUMMARY OF THE INVENTION

It is therefore an object of the present invention to improve systems for constructing shelving.

A further object of the present invention is to provide a shelf support unit that is extremely simple to install.

Another object of the present invention is to provide a shelf support unit that can be installed with a minimum amount of damage being done to the shelves.

Yet another object of the present invention is to provide a shelving system that will allow the shelf structure to be expanded or contracted with a minimum amount of difficulty.

Still another object of the present invention is to construct a shelf structure without the aid of special tools.

A still further object of the present invention is to reduce the cost of shelving systems.

These and other objects of the present invention are attained by means of a shelving system having one or more support units that include a U-shaped bracket that is secured to one shelf in the system by a hidden screw that is affixed to a cross arm of the bracket. A pair of cap shaped bushings are also secured by hidden screws to an opposing shelf. The bushings are adapted to receive in close sliding relationship wherein the extended legs of the bracket and thus hold the two shelves in spaced-apart relationship. Each support unit can be rapidly secured to the shelves without the aid of special tools and requires no extra hardware or special holes to be drilled in the parts which might mar the final structure.

BRIEF DESCRIPTION OF THE DRAWINGS

For a better understanding of these and other objects of the present invention, reference is had to the following detailed description of the invention which is to be read in conjunction with the accompanying drawings, wherein:

FIG. 1 is a perspective view showing a shelving system containing a pair of support units embodying the teachings of the following invention;

FIG. 2 is an enlarged partial perspective view of a support unit as illustrated in FIG. 1 further showing the hidden screw utilized therein;

FIG. 3 is a further enlarged view showing one of the end bushings of the support unit shown in alignment with one of the legs of the unit; and FIG. 4 is a partial view showing one leg of the bracket provided with an end closure.

DESCRIPTION OF THE INVENTION

Turning initially to FIG. 1, there are shown two pieces of parallel shelving 11 and 25 that are cojoined by means of two support units 13—13 to form a shelving system generally referenced 10. Although the present system contains only two shelves, it should become apparent from the disclosure below that the present invention is not limited to this specific configuration. It is contemplated within the scope of the present invention that any number of shelves may be similarly employed and a wide variety of structural configurations created using the apparatus of the present invention. Although the instant system is referred to as a shelving system, it should be clear to one skilled in the art that it can be used to create what is generally called "knockdown furniture" having a great number of uses.

With further reference to FIGS. 2 and 3, the support units each contain a U-shaped bracket generally referenced 14 and a pair of cap-like bushings generally referenced 20. As illustrated, the bracket includes two legs 15—15 that are of equal length and which are cojoined at their proximal ends by a cross member 16. In practice, the legs are placed in parallel alignment and the cross member is perpendicularly mounted in reference to the legs.

In the present embodiment of the invention, the U-shaped bracket is fabricated from a single piece of round tubular stock that is bent into the desired configuration. The one piece bracket can be formed of metal, heavy plastic or any other suitable material having the necessary strength to support shelving. Similarly, the legs and cross member making up the bracket can be formulated from separate pieces of materials that are bonded or joined together in assembly to provide the described shape. Materials such as wood, which do not lend themselves to bending, are ideally well suited for use in this type of construction. It should be further pointed out that cross-sectional configurations of the individual parts do not necessarily have to be round but can take any shape that is useful.

A tapered wood screw 18 is securely held in the cross member of the bracket as illustrated in FIG. 2. The screw is mounted in parallel alignment with the central axes of the two legs and extends outwardly from the top surface of the cross member. Accordingly, the screw will move with the bracket. To secure the bracket to a shelf, a small starting hole is simply made in the bottom surface of the shelf at a desired center location and the point of the screw inserted therein. The starting hole can be easily established by a nail or any other pointed instrument. To thread the screw into the shelf, the two legs of the bracket are turned about the central axis of the screw. The bracket provides more than enough leverage to drive the screw into the shelf. The screw is drawn up until the top surface cross member is tightly seated against the bottom surface of the shelf.

To complete the support unit, the end caps or bushings 20 are secured to the top surface of the opposite shelf. Each bushing includes a hollow tubular body section 17 that is open at one end and contains a radial wall 19 at the other end. As in the case of the bracket, each bushing also contains a wood screw 23 that is securely mounted in the end wall and which extends outwardly therefrom along the central axis of the bushing. Where the bushing is formed of metal, the screw is welded or otherwise joined to the bushing so that it will turn with the bushing.

Preferably each bushing contains an axial slot cut in the side wall thereof that extends downwardly from its open end toward the closed end wall. The internal opening of the bushing compliments the outer configuration of the bracket legs and is adapted to slidably receive a leg therein with a close sliding fit. The slot 21 provides the bushing with sufficient radial deformability to permit the leg to be snuggly seated therein without the danger of the two cojoined members binding.

To mount the bushings, the bracket is first joined to the top shelf and the exact location of the legs in relation to the top surface of the companion or lower shelf is determined. A small starting hole is then formed in the lower shelf at the center of each leg position. The extended wood screw 23 of the bushing is inserted into the starting hole and the bushing turned to drive the screw into the shelf. The bushing is turned until its end wall is securely seated in contact against the shelf. The blade of a screwdriver or knife may be obliquely placed into the slot to provide added leverage to insure that the bushing is well seated against the shelf.

With the bracket secured to one shelf and the bushings to another, the legs of the bracket are inserted into the open end of the appropriate receiving bushing and the distal ends of the legs pushed down until they are bottomed against the end walls of the bushing. As seen in FIG. 1, two support units can be used to join a pair of shelves and thus complete a section. It should be equally clear that support units of differing lengths and widths can be employed to develop shelving systems having a wide variety of shelf combinations. It should also be noted that this type of shelving can be constructed with a minimum amount of damage being done to the shelves. As a result, a specific combination can be quickly broken down and changed without great difficulty and in a minimum amount of time.

It is believed that by maintaining the axial length of each leg at about two and one-half to three times the axial length of the companion receiving bushing, an extremely strong and stable shelf system can be created.

Referring now to FIG. 4, there is shown an end closure means 30 operatively connected to one of the bracket legs to provide a non-slip pad upon which the bracket can rest. The end closure includes a cylindrical shank 31 that is capable of being press fitted into the hollow bracket leg to securely seat the closure therein. The outer end of the closure terminates in a widened flange 32 which, in assembly, abuts the end face of the leg. It is envisioned that a pair of brackets 13—13 may be secured to a single piece of upper shelving 11 as noted above and the shelf unit placed upon a counter top or the like without need of a bottom shelf. Accordingly, by use of the closures, the brackets can be made to accommodate a single shelf without need of special tools or the like. Preferably, the closures are formed of a suitable rubber-like material that is capable of furnishing a soft, non-slip surface for securely seating the shelf upon a support surface.

While this invention has been described with reference to the details as set forth above, it is not limited to the specific structure as disclosed and the invention is intended to cover any modifications or changes as may come within the scope of the following claims.

I claim:

1. A support unit for use in a shelving system that includes
    a U-shaped bracket formed from a single piece of tubing having two spaced-apart parallel legs that are cojoined at their proximal ends by a straight perpendicular cross member,
    a first wood screw securely affixed to the cross member and extended outwardly from the top surface thereof along an axis that is parallel with the axes of said legs whereby the screw can be threaded into a shelf by turning the bracket about the axis of the screw to draw the cross member tightly against the shelf
    a pair of cup-like bushings, each of which is capable of slidably receiving the distal end of one of the bracket legs therein, and
    a second wood screw securely affixed in the end wall of each bushing that is axially aligned with the bushing and which extends outwardly from the top surface thereof whereby each bushing can be threaded into a second shelf by turning the bushing about the axis of said second screw to draw the top surface of the cap tightly against the second shelf thereby enabling the two shelves to be cojoined by the support unit.

2. The apparatus of claim 1 wherein the legs of the bracket and the inner wall of each bushing provide a close sliding fit to securely hold the leg within the bushing.

3. The apparatus of claim 1 wherein the side wall of each bushing is provided with an axially extended slit to facilitate insertion of the bracket legs and prevent binding of the two members.

4. The apparatus of claim 1 wherein the axial length of each leg is between $2\frac{1}{2}$ to 3 times the axial length of each bushing.

5. In a shelving system including at least one pair of spaced-apart top and bottom shelves, a series of U-shaped brackets mounted between the shelves with each bracket having a pair of parallel tubular legs that are cojoined at their proximal ends by a perpendicular cross member upon which is securely fastened an outwardly extended screw that is threadably received within the bottom surface of the top shelf to draw the cross member into tight contact against the bottom surface of said top shelf, a pair of cap like tubular bushings associated with each bracket that are open at one end and closed at the other end by means of an end wall, each bushing being adapted to slidably receive a leg of a bracket therein and further including a second wood screw securely affixed in the end wall thereof that extends outwardly from the bushing, said second wood screw being threaded into the top surface of the bottom shelf to draw the end wall of the bushing into seating contact against said bottom shelf, whereby the legs of each bracket are passed into a pair of bushings to form a unit capable of supporting the shelves in a spaced apart configuration.

6. The shelving system of claim 5 wherein the shelves are formed of wood and the screws are each tapered wood screws.

7. The shelving system of claim 5 wherein the side wall of each bushing contains an axial slit formed therein that extends downwardly from the open end thereof toward the end wall.

8. The shelving of claim 7 wherein the legs of each bracket and the inner surface of each bushing are of a size and a shape to provide a close running fit therebetween.

9. The shelving of claim 5 wherein the axial length of each leg is between $2\frac{1}{2}$ and 3 times the length of the receiving bushing.

10. The shelving of claim 5 wherein said first wood screw is centered upon the cross member.

* * * * *